United States Patent
Baughman et al.

(10) Patent No.: US 8,644,501 B2
(45) Date of Patent: Feb. 4, 2014

(54) PAIRED CARRIER AND PIVOT STEGANOGRAPHIC OBJECTS FOR STATEFUL DATA LAYERING

(75) Inventors: Aaron K. Baughman, Silver Spring, MD (US); Christian Eggenberger-Wang, Wil (CH); Peter K. Malkin, Ardsley, NY (US); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/973,420

(22) Filed: Dec. 20, 2010

(65) Prior Publication Data

US 2012/0155634 A1 Jun. 21, 2012

(51) Int. Cl.
*H04K 1/00* (2006.01)
*H04L 9/00* (2006.01)
*H04L 9/28* (2006.01)

(52) U.S. Cl.
USPC ............. 380/28; 380/277; 713/168; 713/183; 713/189

(58) Field of Classification Search
USPC .............. 713/168, 183, 189; 380/28, 277
See application file for complete search history.

(56) References Cited

U.S. PATENT DOCUMENTS

| | | | |
|---|---|---|---|
| 6,111,954 A | 8/2000 | Rhoads | |
| 6,266,430 B1 | 7/2001 | Rhoads | |
| 6,353,672 B1 | 3/2002 | Rhoads | |
| 6,363,159 B1 * | 3/2002 | Rhoads | 382/100 |
| 6,456,726 B1 * | 9/2002 | Yu et al. | 382/100 |
| 6,557,103 B1 * | 4/2003 | Boncelet et al. | 713/176 |
| 6,978,371 B1 | 12/2005 | Yu | |
| 6,987,862 B2 | 1/2006 | Rhoads | |
| 7,231,049 B2 * | 6/2007 | Kawaguchi et al. | 380/277 |
| 7,602,978 B2 * | 10/2009 | Levy et al. | 382/232 |
| 7,761,712 B2 * | 7/2010 | Moskowitz et al. | 713/176 |
| 8,023,691 B2 * | 9/2011 | Rodriguez et al. | 382/100 |
| 8,219,578 B2 * | 7/2012 | Hendrey et al. | 707/769 |
| 8,238,553 B2 * | 8/2012 | Moskowitz et al. | 380/231 |
| 8,280,103 B2 * | 10/2012 | Petrovic et al. | 382/100 |
| 8,417,948 B2 * | 4/2013 | Dawson | 713/168 |

(Continued)

FOREIGN PATENT DOCUMENTS

WO  2009101600 A1  8/2009

OTHER PUBLICATIONS

Rozendaal et al., International Application No. PCT/EP2011/072731, PCT International Search Report and the Written Opinion of the International Searching Authority, CHA100026, May 2, 2012, 10 pages.

(Continued)

*Primary Examiner* — Jeffrey Pwu
*Assistant Examiner* — Jayesh Jhaveri
(74) *Attorney, Agent, or Firm* — Douglas A. Lashmit; Hoffman Warnick LLC

(57) ABSTRACT

A system, method and program product for utilizing a steganographic process to hide data element in a carrier object. A system is disclosed that includes: a pivot object generator that generates a pivot object having a key hidden therein, wherein the key is hidden in the pivot object based on an inputted salt; and a carrier object generator that generates a carrier object having a data element hidden therein using a steganographic hiding system, wherein the steganographic hiding system requires utilization of the key to extract the data element from the carrier object.

20 Claims, 5 Drawing Sheets

(56) References Cited

U.S. PATENT DOCUMENTS

| | | |
|---|---|---|
| 2005/0271246 A1* | 12/2005 | Sharma et al. ............... 382/100 |
| 2006/0041762 A1* | 2/2006 | Ma .............................. 713/189 |
| 2007/0300071 A1 | 12/2007 | Kesal et al. |
| 2008/0069340 A1* | 3/2008 | Vaughn .......................... 380/28 |
| 2008/0075277 A1* | 3/2008 | Moskowitz et al. ............ 380/28 |
| 2008/0175377 A1* | 7/2008 | Merrill ........................... 380/30 |
| 2009/0141931 A1 | 6/2009 | Yadid-Pecht et al. |
| 2010/0091981 A1* | 4/2010 | Shi et al. ........................ 380/28 |
| 2010/0293376 A1* | 11/2010 | Colon .......................... 713/168 |
| 2011/0001603 A1* | 1/2011 | Willis ........................... 340/5.2 |
| 2011/0016512 A1* | 1/2011 | Colon ............................... 726/4 |
| 2011/0055585 A1* | 3/2011 | Lee .............................. 713/183 |

OTHER PUBLICATIONS

Kumar et al., "A multilayered architecture for hiding executable files in 3D images", Indian Journal of Science and Technology, vol. 3, No. 4, Apr. 2010, pp. 402-407.

\* cited by examiner

PAIRED CARRIER AND PIVOT STEGANOGRAPHIC OBJECTS FOR STATEFUL DATA LAYERING

BACKGROUND

The present invention relates to the use of steganography to hide data within multimedia objects, and more particularly relates to layering data using paired carrier and pivot steganographic streams.

Steganography is the art and science of writing hidden messages in such a way that no one, apart from the sender and intended recipient, suspects the existence of the message, a form of security through obscurity. Steganography includes the concealment of information within computer files. In digital steganography, electronic communications may include steganographic coding inside of a transport layer, such as a document file, image file, program or protocol. Media files are ideal for steganographic transmission because of their large size. As a simple example, a sender might start with an innocuous image file and adjust the color of every 100th pixel to correspond to a letter in the alphabet, a change so subtle that someone not specifically looking for it is unlikely to notice it.

BRIEF SUMMARY

Disclosed is an approach to enable multi-modal and independent device correlated steganography. The approach contemplates the use of two objects (or streams) for hiding data, a carrier object for containing the actual data to be hidden and a pivot object for containing a key. The key determines how the carrier object conceals/reveals the hidden data. A first embodiment of the present invention provides a system for hiding data in a carrier object, comprising: a pivot object generator that generates a pivot object having a key hidden therein, wherein the key is hidden in the pivot object based on an inputted salt; and a carrier object generator that generates a carrier object having a data element hidden therein using a steganographic hiding system, wherein the steganographic hiding system requires utilization of the key to extract the data element from the carrier object.

A second aspect of the invention provides a method of processing data in a carrier object, comprising: providing a carrier object and a pivot object at an encoding system; inputting a data element to be hidden in the carrier object and a salt at the encoding system; generating a modified pivot object that includes a key hidden therein, wherein the key is hidden based on the salt; and utilizing a steganographic hiding system to generate a modified carrier object having the data element hidden therein, wherein the steganographic hiding system requires utilization of the key to extract the data element from the modified carrier object.

A third aspect of the invention provides a computer readable storage medium having a program product stored thereon for storing hidden data in a carrier object, comprising: program code for processing a carrier object and a pivot object; program code for inputting a data element to be hidden in the carrier object and a salt; program code for generating a modified pivot object that includes a key hidden therein, wherein the key is hidden based on the salt; and program code for generating a modified carrier object having the data element hidden therein utilizing a steganographic process, wherein the steganographic process requires utilization of the key to extract the data element from the modified carrier object.

A fourth aspect of the invention provides a computer readable storage medium having a program product stored thereon for extracting hidden data in a carrier object, comprising: program code for processing a carrier object and a pivot object; program code for inputting a salt; program code for extracting a key from the pivot object, wherein the key is hidden based on the salt; and program code for extracting a data element from the carrier object utilizing a steganographic process, wherein the steganographic process requires the key to extract the data element.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

Figure 1:
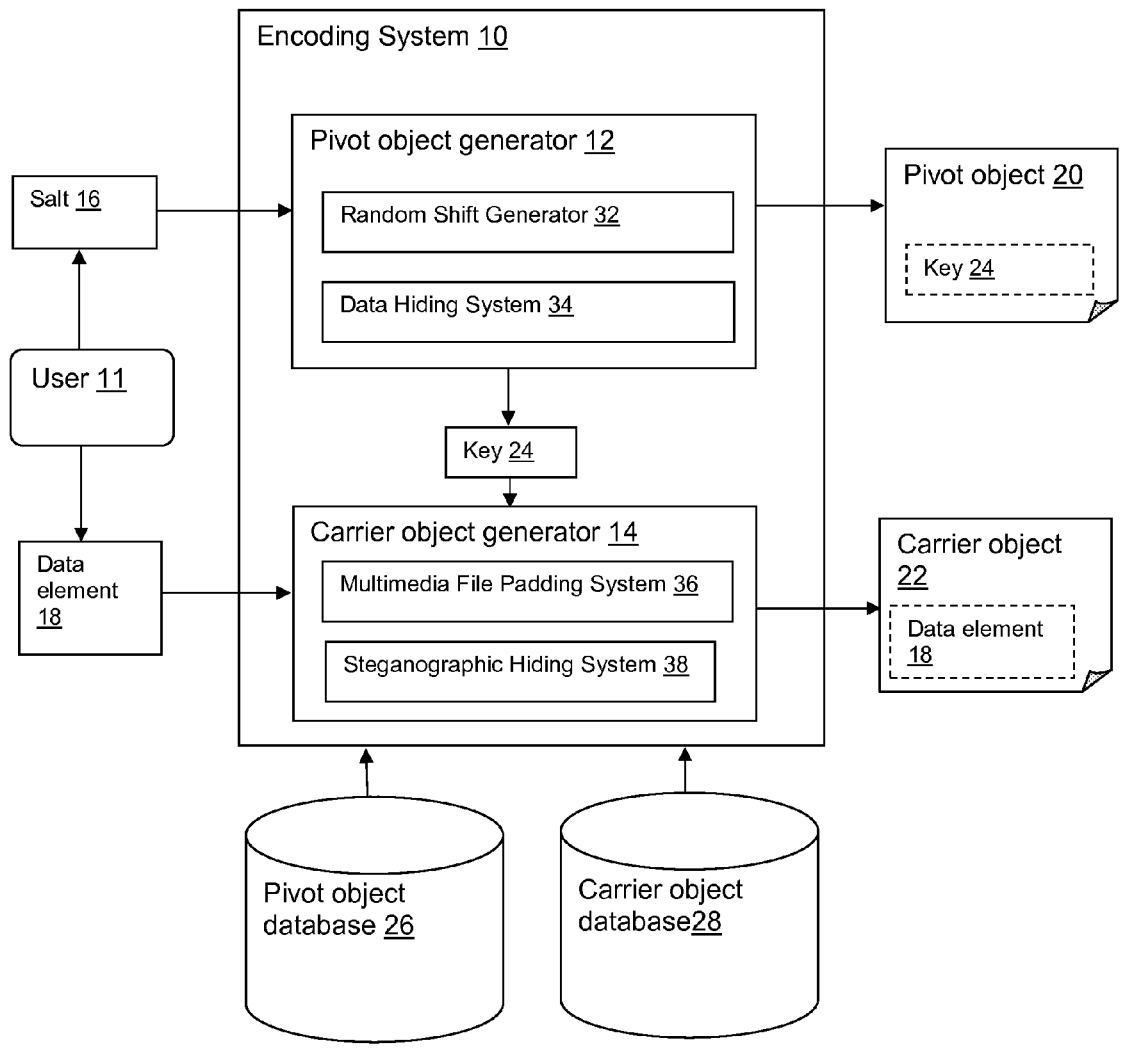
FIG. 1 depicts an encoding system for hiding data in a carrier image in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

FIG. 1 depicts an encoding system 10 for using steganography to hide a data element 18 inputted from a user 11 in a carrier object 22. The approach contemplates the use of a second object, the pivot object 20, to store a key 24 that dictates how the carrier object 22 conceals/reveals the data element 18. Key 24 is concealed in the pivot object 20, thus providing multiple layers of security. Pivot object 20 and carrier object 22 may comprise any type of electronic objects, such as multimedia objects including images, video, audio, mixed media, etc. In addition, it is understood that the term "object" may include any type of entity or structure, e.g., a file, a stream of data, a signal, etc. Thus, for example, the carrier object 22 and pivot object 20 may comprise electronic images residing on a storage device or being streamed across a network.

Encoding system 10 generally includes a pivot object generator 12 and a carrier object generator 14. Pivot object generator 12 generates a pivot object 20 that has been modified to include a key 24 hidden therein. For example, pivot object 20 may comprises an image selected from a pivot object database 26, or comprise an image or other object provided by user 11. In another embodiment, pivot object 20 may comprise an audio or video file.

In the depicted embodiment, pivot object generator 12 includes a random shift generator 32 that generates a random key 24 and includes a data hiding system 34 for hiding the key 24 in the pivot object 20. A salt 16 inputted by user 11 dictates how the key 24 is hidden in the pivot object 20. Salt 16 may for example comprise any "knowledge" inputted by the user, e.g., a pet's name, a favorite color, a city of birth, last four digits of a social security number, etc. For example, key 24 may comprise a 128-bit randomly generated code that is stored in a set of 128 pixels in a pivot object 20 (e.g., an image). In the case of an image, salt 16 may be utilized to provide an index into the image to dictate an order or starting point at which the pixels store the data. In the case of a digital audio file, key 24 could be stored in every nth bit, and salt 16 might determine a starting point.

Carrier object generator 14 generates the carrier object 22 modified to contain the data element 18 hidden therein. Data element 18 may comprise any type of electronic data the user 11 (or some other process or entity) wishes to hide, e.g., a password, a phrase or sentence, a file, an object, an image, an audio recording, etc. Carrier object 22 may comprise an object selected from a carrier object database 28, an object provided by the user 11, or an object obtained from any other source. For example, the user 11 may supply an image saved on his or her smart phone to act as the carrier object 22.

Carrier object generator 14 may include a multimedia file padding system 36 that determines a file padding strategy for effectively incorporating data element 18 into a given carrier object 22. Multimedia file padding system 36 also provides error checking to ensure that the data element 18 can be effectively stored in the carrier object 22. For example, if user 11 sought to store a large amount of secret data into a relatively small carrier object 22, multimedia file padding system 36 could flag the operation as impermissible, and instead recommend a larger carrier object 22 that can accommodate a given file padding strategy. Once the file padding strategy is deemed acceptable, steganographic hiding system 38 utilizes key 24 (generated by pivot object generator 12) to hide the data element 18 in the carrier object 22. Data element 18 may be stored in carrier object 18 using any now known or later developed steganographic process.

Figure 2:
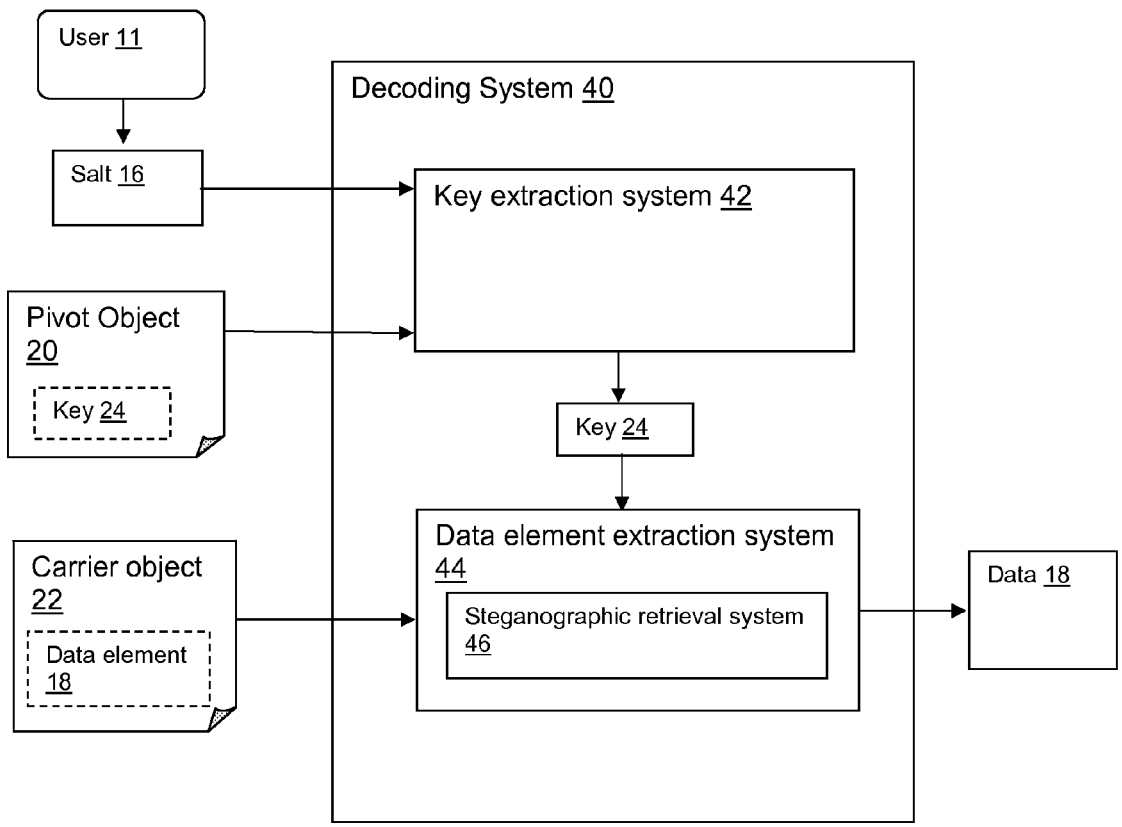
FIG. 2 depicts a decoding system for extracting data from a carrier image in accordance with an embodiment of the present invention.

FIG. 2 depicts a decoding system 40 for retrieving data element 18 from a carrier object 22. Decoding system 40 includes a key extraction system 42 and a data element extraction system 44. In operation, decoding system 40 is presented with salt 16 from the user 11, as well as a copy of the pivot object 20 and the carrier object 22. Key extraction system 42 utilizes the same logic scheme to extract key 24 from the pivot object 20 as used by the pivot object generator 12 (FIG. 1) to hide the key 24.

Once the key 24 is obtained, data extraction system 44 utilizes the key 24 to extract the data element 18 from the carrier object 22 utilizing steganographic retrieval system 46. Steganographic retrieval system 46 utilizes the same steganographic technique to extract the data element 18 as used by the carrier object generator 14 (FIG. 1) to hide the data element 18.

Figure 3:
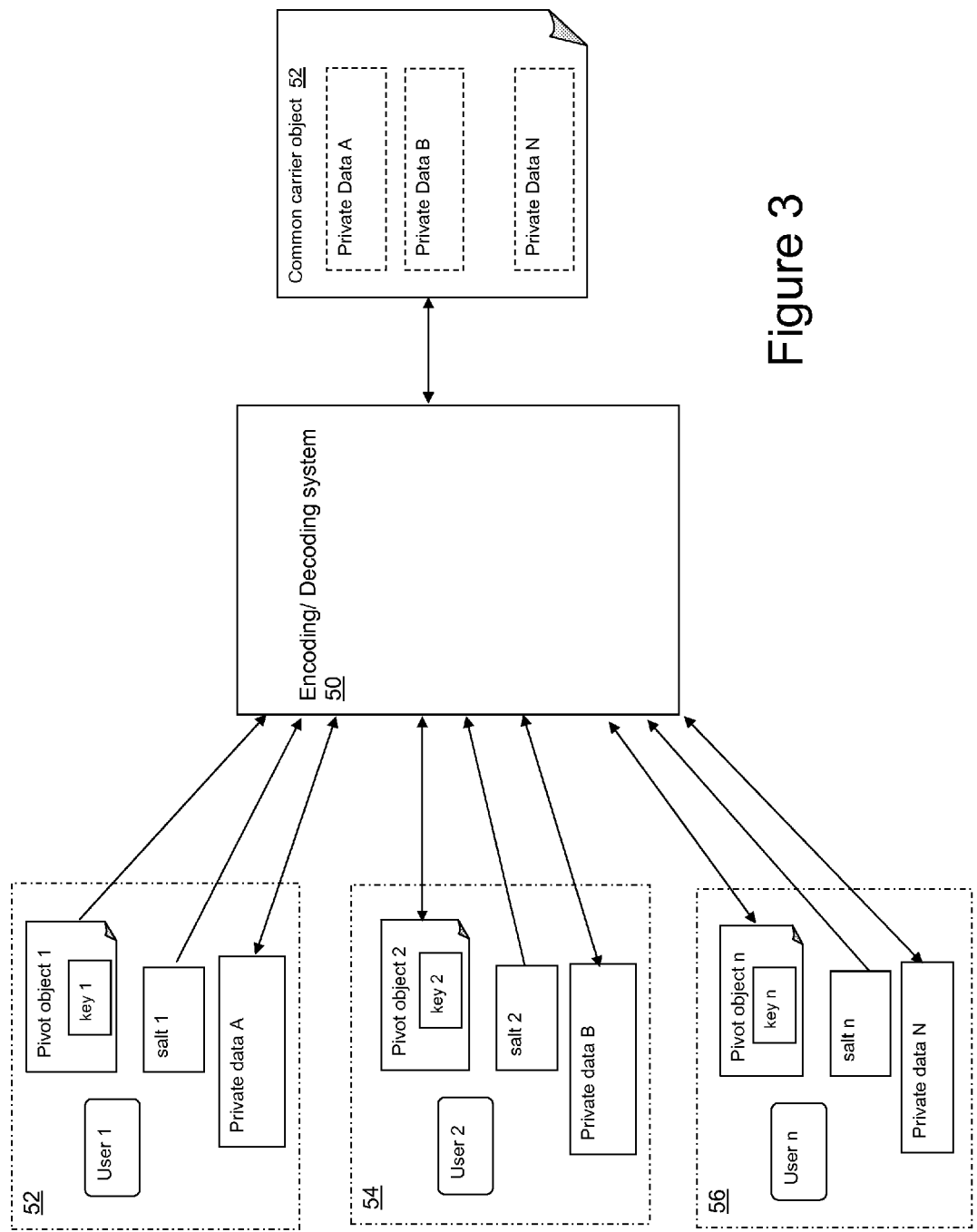
FIG. 3 depicts an encoding/decoding system that hides data in a carrier object from a plurality of users in accordance with an embodiment of the present invention.

FIG. 3 depicts an embodiment in which an encoding/decoding system 50 is utilized to hide and retrieve private data A, B, N from a plurality of users 52, 54, 56 to and from a single common carrier object 52. In this case, encoding/decoding system 50 operates in the same fashion as encoding system 10 and decoding system 40 of FIGS. 1 and 2, except that only a single common carrier object 52 is utilized to store private data for multiple users. In the encoding phase, the user provides (1) a pivot object (without a key), (2) salt, and (3) private data, to the encoding/decoding system 50. The private data is hidden in the common carrier object 52 as described above with reference to FIG. 1 and a pivot object modified with a unique key is returned to the user. In the decoding phase, the user provides the modified pivot object (i.e., with an embedded key) and salt to the encoding/decoding system 50 in order to retrieve the user's private data from the common carrier object 52.

Thus for example, common carrier object 52 may comprise an image on a web page or social networking site. A first user could store a private message in the common carrier object 52, and then email a second image (containing the modified pivot object) and salt to a second user. The second user could then access the private message.

In an analogous embodiment, common carrier object 52 may simply store multiple "layers" of hidden data for a single user that require different keys to extract the full dataset. Thus a single user may require multiple keys to extract different portions of a hidden message.

In a similar manner, multiple users could share the same pivot object. In such an embodiment, keys for each of the users would be stored and retrieved to and from a single pivot object.

Figure 4:
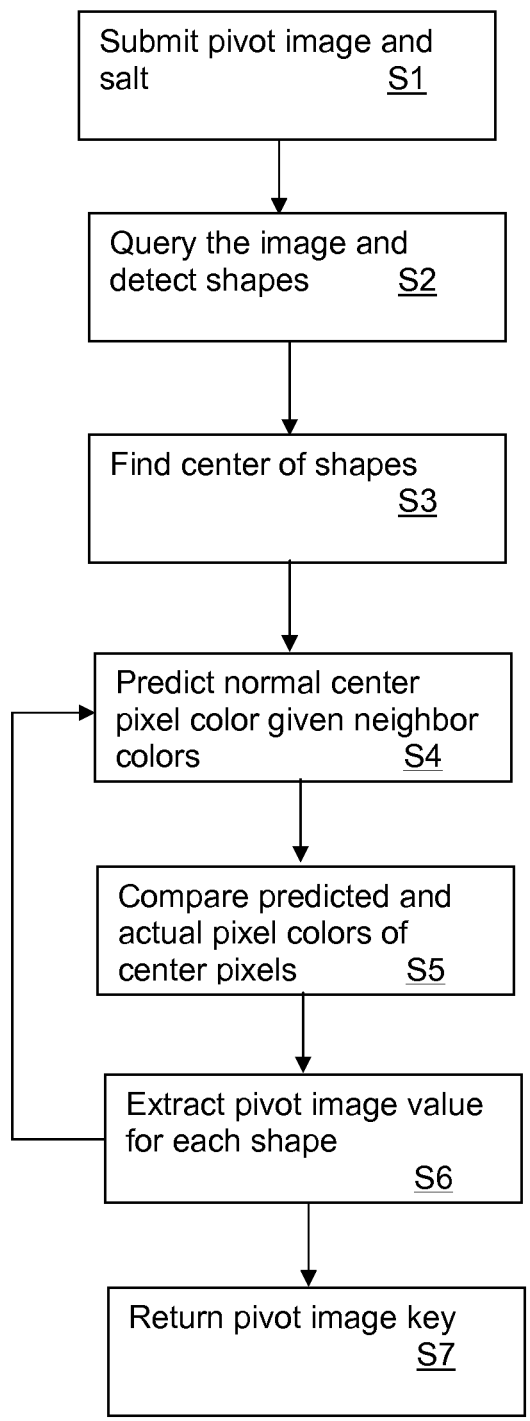
FIG. 4 depicts a flow chart for extracting a key in accordance with an embodiment of the present invention.

FIG. 4 depicts a flow chart for extracting a numerical key from a pivot image in which the key is encoded in pixel data within predefined shapes within the pivot image. At S1, the pivot image and salt are submitted. At S2, the pivot image is queried to detect a set of predefined shapes, e.g., circular patterns. At S3, the centers of the shapes are determined using any known technique. At steps S4, S5 and S6, a value is extracted from each of the set of detected shapes in order to form the key. In this embodiment, a predicted color of a center pixel is first determined based on neighboring pixels at S4. At S5, the predicted and actual center pixel colors are compared and at S6 a value, e.g., a difference is extracted for each shape. Each of the extracted values can then be combined (e.g., concatenated) to form the key, which is returned at S7. Note that the order that the extracted values are obtained and placed into the key can be determined based on the inputted salt. For example, assume the key is an eight digit number (e.g., 12345678) and there are eight balloons in the pivot image that appear next to each other left-to-right. An integer value 0-9 can thus be extracted from each balloon to form the key. The inputted salt may act as an index to dictate what balloon to start with.

Figure 5:
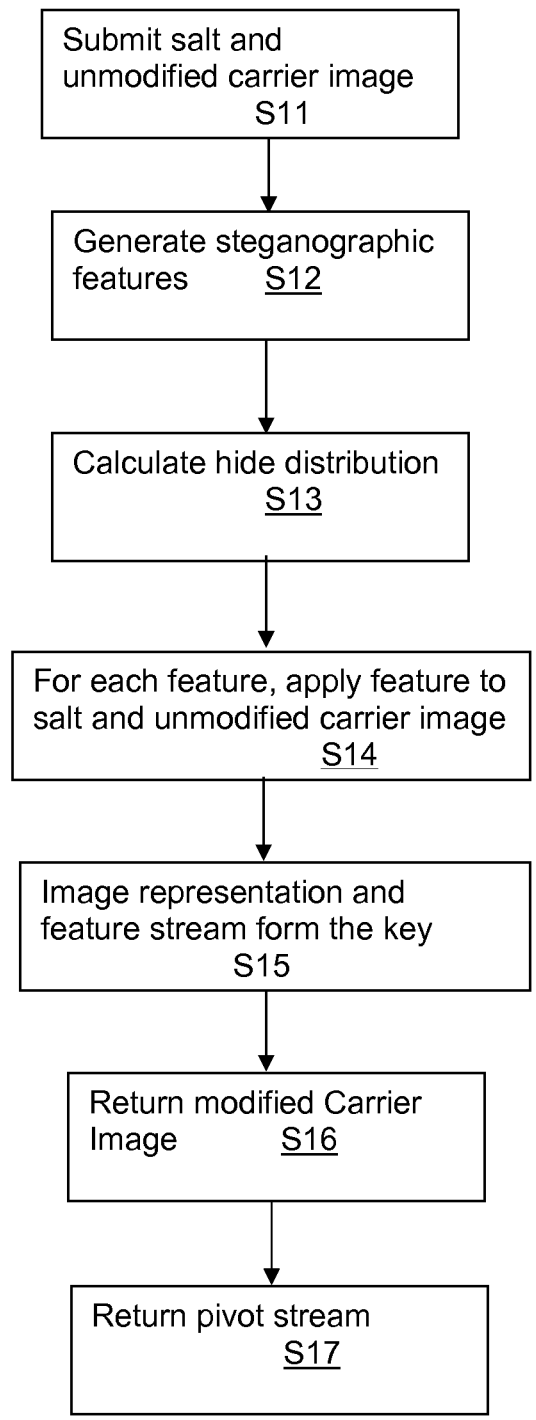
FIG. 5 depicts a flow chart for interleaving of the calculation of the pivot object and carrier object in accordance with an embodiment of the present invention.

FIG. 5 depicts a flow chart showing an interleaved process of acquiring both a base image in which to hide a data element as well as user generated salt. In this embodiment, a user submits an unmodified carrier (i.e., base) image (that will later contain the hidden data) and salt at S11. At S12, steganographic features of the unmodified carrier image are generated and a hide distribution is calculated at S13. Steganographic features include the instruction set that describes how the data to be hidden is camouflaged within the carrier image, e.g., bit shifting. Hide distribution comprises models that have been developed to optimize the space within the carrier image to place the hidden message. An increase of sparseness would help to visually hide the data. Next, at S14, for each steganographic feature, the feature is applied to salt and the unmodified carrier image. By applying each feature within a steganographic feature vector, the hidden data is placed into the base image that will result in a carrier image. The salting aspect provides a random number generator that, e.g., changes the bit level of hiding. This helps to make guessing a pattern of hiding data very difficult. At S15, the image representation and steganographic features form the key--the salt and key is combined into a pivot stream. At S16, the modified carrier image is returned and at S17 the pivot stream is returned.

Additional embodiments that utilize the techniques described herein may for instance include the concept of a 3D password. In such an embodiment, a user creates a carrier object with a password, image or any other electronic data. A pivot object is implemented with a set of blocks wherein each block forms a logical unit into which a key can be hidden. Each block may for example be correlated with an image, and the blocks are indexed by a salt that provides a location within the pivot object to located/find the key. Next, the pivot object is hidden inside a music file or any multimedia file. In addition, a series of images are hidden within layers of an overarching multimedia file known as the steganographic (i.e., carrier) object. The steganographic and pivot objects are stored on a computational device.

As the user accesses a website or computational device, the user enters a password to unlock the pivot object. Next, the pivot object is applied to the steganographic object to display the hidden media. The user is then assured that they are not on a side scripted website. In many web applications, particularly banking sites, the user is presented with a pass image. The pass image provides another level of security such that a server provided image acts as a public key that identifies the website. Going a step further, when a key is applied to the server provided image, a hidden picture or the original data is recovered.

Another illustrative embodiment may comprise a broadcast synchronized substrate mood indicator. In such an embodiment, a music media has encoded information that changes the size, shape and color of digital or organic substrates, such as an LCD, LED, plasma or holographic display. The music stream contains the pivot object that contains hidden states, which might for example include mappings between emotional feelings and colors. The hidden states are synced to digital images scattered around an area, e.g., images on walls within an arena in a physical or virtual space. As each digital image perceives a hidden state, the content of the digital image changes color and size. As a result, the broadcasted hidden state unlocks hidden data within the carrier object of a digital image. As the music plays, each digital image changes. The cumulative sound from both the source (i.e. drum player) and audience (i.e. cheering crowd) produces a unique watermark and unique entertainment experience for each deployed venue.

For example, assume a participant is playing the electric guitar within an auditorium. As he or she plays, the tempo (frequency/amplitude) changes which also invokes responses from the crowd. A directional microphone captures the source of sound from the guitar while peripheral microphones are acquiring the crowd's noise. The combination of sound sources creates a sound watermark that unlocks a pivot stream. The pivot stream is applied to the carrier stream that changes the color of the original image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Accordingly, the encoding system 10 and/or decoding system 40 may be implemented as general purpose computer systems having, e.g., a processor, memory, I/O, a bus, etc., or as specific purpose computer systems, e.g., an ASIC device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one computing device configured to hide data in a carrier object, the at least one computing device including:
   a pivot object generator that generates a pivot object having a key hidden therein, wherein the key is hidden in the pivot object based on an inputted salt; and
   a carrier object generator that generates a carrier object having a data element hidden therein using a steganographic hiding system,
   wherein the steganographic hiding system requires utilization of the key to extract the data element from the carrier object,
   wherein the inputted salt comprises a knowledge element provided by a user that hides the data element in the carrier object,
   wherein the knowledge element includes any knowledge inputted by the user,
   wherein the salt dictates an order of data in the key, and
   wherein the salt further dictates a starting point of the data in the key.

2. The system of claim 1, wherein the pivot object and the carrier object each comprise a multimedia object selected from a group consisting of: an image, an audio recording, a video, and a mixed media object.

3. The system of claim 1, wherein the pivot object generator includes a random shift generator and a data hiding system.

4. The system of claim 1, wherein the carrier object generator includes a multimedia file padding system that ensures that the data element can be effectively hidden in the carrier object.

5. The system of claim 1, wherein the data element comprises a password.

6. The system of claim 1, wherein the knowledge element includes any knowledge inputted by the user, and wherein the salt dictates an order of data in the key.

7. The system of claim 6, wherein the salt further dictates a starting point of the data in the key and wherein the salt provides a location within the data of the pivot object to hide the key.

8. A method of processing data in a carrier object performed using at least one computing device, the method comprising:
   providing a carrier object and a pivot object at an encoding system;
   inputting a data element to be hidden in the carrier object and a salt at the encoding system;
   generating a modified pivot object that includes a key hidden therein using the at least one computing device, wherein the key is hidden based on the salt; and
   utilizing a steganographic hiding system to generate a modified carrier object having the data element hidden therein,
   wherein the steganographic hiding system requires utilization of the key to extract the data element from the modified carrier object,
   wherein the salt comprises a knowledge element provided by a user that hides the data element in the carrier object,
   wherein the knowledge element includes any knowledge inputted by the user,
   wherein the salt dictates an order of data in the key, and
   wherein the salt further dictates a starting point of the data in the key.

9. The method of claim 8, further comprising:
inputting the salt into a decoding system;
extracting the key from the modified pivot object using the salt; and
extracting the data element from the modified carrier object using the key.

10. The method of claim 8, wherein the pivot object and the carrier object each comprise a multimedia object selected from a group consisting of: an image, an audio recording, a video and a mixed media object.

11. The method of claim 8, wherein generating the pivot object includes utilizing a random shift generator and a data hiding system to generate and hide the key.

12. The method of claim 8, wherein generating the carrier object includes utilizing a multimedia file padding system to ensure that the data element can be effectively hidden in the carrier object.

13. The method of claim 8, wherein the data element comprises a password.

14. A non-transitory computer readable medium having a program product stored thereon for storing hidden data in a carrier object, comprising:
program code for processing a carrier object and a pivot object;
program code for inputting a data element to be hidden in the carrier object and for inputting a salt;
program code for generating a modified pivot object that includes a key hidden therein, wherein the key is hidden based on the salt; and
program code for generating a modified carrier object having the data element hidden therein utilizing a steganographic process,
wherein the steganographic process requires utilization of the key to extract the data element from the modified carrier object,
wherein the salt comprises a knowledge element provided by a user that is hiding the data element in the carrier object,
wherein the knowledge element includes any knowledge inputted by the user,
wherein the salt dictates an order of data in the key, and
wherein the salt further dictates a starting point of the data in the key.

15. The non-transitory computer readable medium of claim 14, wherein the pivot object and the carrier object each comprise a multimedia object selected from a group consisting of: an image, an audio recording, a video and a mixed media object.

16. The non-transitory computer readable medium of claim 14, wherein the program code for generating the pivot object includes utilizing a random shift generator and a data hiding system to generate and hide the key.

17. The non-transitory computer readable medium of claim 14, wherein the program code for generating the carrier object includes utilizing a multimedia file padding system to ensure that the data element can be effectively hidden in the carrier object.

18. The non-transitory computer readable medium of claim 14, wherein the data element comprises a password.

19. The non-transitory computer readable medium of claim 14, wherein the starting point of the data in the key includes a location within the data of the pivot object to hide the key.

20. A non-transitory computer readable medium having a program product stored thereon for extracting hidden data in a carrier object, comprising:
program code for processing a carrier object and a pivot object;
program code for inputting a salt;
program code for extracting a key from the pivot object, wherein the key is hidden based on the salt; and
program code for extracting a data element from the carrier object utilizing a steganographic process,
wherein the steganographic process requires the key to extract the data element,
wherein the salt comprises a knowledge element provided by a user that hides the data element in the carrier object,
wherein the knowledge element includes any knowledge inputted by the user,
wherein the salt dictates an order of data in the key, and
wherein the salt further dictates a starting point of the data in the key.

* * * * *